(12) United States Patent
Mahy et al.

(10) Patent No.: US 9,659,215 B2
(45) Date of Patent: May 23, 2017

(54) RASTER IMAGE PROCESSING METHOD

(71) Applicant: AGFA GRAPHICS NV, Mortsel (BE)

(72) Inventors: Marc Mahy, Mortsel (BE); Daniel Saez Trigueros, Mortsel (BE)

(73) Assignee: AGFA GRAPHICS NV, Mortsel (BE)

( * ) Notice: Subject to any disclaimer, the term of this patent is extended or adjusted under 35 U.S.C. 154(b) by 0 days.

(21) Appl. No.: 15/022,967

(22) PCT Filed: Oct. 3, 2014

(86) PCT No.: PCT/EP2014/071258
§ 371 (c)(1),
(2) Date: Mar. 18, 2016

(87) PCT Pub. No.: WO2015/052094
PCT Pub. Date: Apr. 16, 2015

(65) Prior Publication Data
US 2016/0232407 A1    Aug. 11, 2016

(30) Foreign Application Priority Data

Oct. 7, 2013  (EP) ..................................... 13187497

(51) Int. Cl.
G06K 15/00 (2006.01)
G06K 9/00 (2006.01)
G06T 11/60 (2006.01)
G06K 9/62 (2006.01)
H04N 1/387 (2006.01)
H04N 1/405 (2006.01)
H04N 1/40 (2006.01)

(52) U.S. Cl.
CPC ....... *G06K 9/00483* (2013.01); *G06K 9/6215* (2013.01); *G06T 11/60* (2013.01); *H04N 1/3872* (2013.01); *H04N 1/40018* (2013.01); *H04N 2201/0082* (2013.01)

(58) Field of Classification Search
CPC .. G06K 9/00483; G06K 9/6215; G06T 11/60; H04N 1/3872; H04N 1/40018; H04N 2201/0082
See application file for complete search history.

(56) References Cited

U.S. PATENT DOCUMENTS

| 5,539,841 | A | * | 7/1996 | Huttenlocher | ....... G06K 9/6211 |
| | | | | | 382/218 |
| 2014/0016872 | A1 | * | 1/2014 | Chao | ..................... G06K 9/622 |
| | | | | | 382/218 |

FOREIGN PATENT DOCUMENTS

EP    1 883 049 A1    2/2011

OTHER PUBLICATIONS

Official Communication issued in International Patent Application No. PCT/EP2014/071258, mailed on Dec. 17, 2014.

* cited by examiner

*Primary Examiner* — Quang N Vo
(74) *Attorney, Agent, or Firm* — Keating and Bennett, LLP

(57) ABSTRACT

A raster image processing method and a raster image processor validate content objects in a document based on similarity, especially on continuity, to convert the similar objects with one or more same parameters of an image manipulation method to achieve a correct reproduction of the document.

11 Claims, 5 Drawing Sheets

| Size | | 512 x 512 | | | 1024 x 1024 | | |
|---|---|---|---|---|---|---|---|
| Radius | CPU | GPU 1 | GPU 2 | CPU | GPU 1 | GPU 2 |
| 2 | 90 ms | 34 ms (x2.65) | 9.5 ms (x9.47ms) | 348 ms | 118 ms (x2.95) | 25 ms (x13.92) |
| 5 | 163 ms | 50 ms (x3.26) | 12 ms (13.58) | 650 ms | 182 ms (x3.57) | 38 ms (x17.1) |

701

RASTER IMAGE PROCESSING METHOD

CROSS-REFERENCE TO RELATED APPLICATIONS

This application is a 371 National Stage Application of PCT/EP2014/071258, filed Oct. 3, 2014. This application claims the benefit of European Application No. 13187497.6, filed Oct. 7, 2013, which is incorporated by reference herein in its entirety.

BACKGROUND OF THE INVENTION

1. Field of the Invention

This invention relates to a raster image processing method by a raster image processor (RIP) to render a document for example a newspaper defined in a page description language format to a content output device for example a printing device.

2. Description of the Related Art

Raster image processing methods are well-known in the graphic industry. Every document, such as a Portable Document Format (PDF) document that needs to be reproduced on a content output device such as a printer device or a display device needs to be processed to a raster graphic by a raster image processor.

It is found that in a document, used in a raster image processing method, similarity of nearby content objects is high due to the nature of the layout in the document but this similarity is not taken in account by a raster image processing method. A raster image processing method may convert these content objects with several image manipulation methods without control of the similarity between the content objects of the document. That's why today the reproduction of a document is not always correct because similar objects may be converted different so the similarity in the reproduction between the reproduced content objects is lost.

EP1883049 (FUJIFILM Corporation) discloses a raster image processing method for page description languages wherein similarity between natural images, as content objects, are checked and if similar are converted by the same image manipulation method.

If two content objects visual continues from a region of the first content object in the transition to a region of the second content object, also these content objects needs to be reproduced correctly by applying the same image manipulation methods.

SUMMARY OF THE INVENTION

In order to overcome the problems described above, preferred embodiments of the present invention have been realised with a raster image processing defined as defined below.

The raster image processing method and raster image processor are validating the content objects in a document on similarity to convert the similar objects with an image manipulation method with one or more same parameters to achieve a correct reproduction of the document so the similarity of the reproduced content objects in the reproduction of the document remains.

To evaluate the similarity between content objects the preferred embodiment of the raster image processing method comprises one or more similarity methods. One of the similarity methods is a continuity control method.

A preferred embodiment of the raster image processing method comprising the following steps:

a) obtaining a first content object and second content object in a document (OBTAIN, 101, 301);

b) calculating a set of similarity values by a set of similarity methods between the first and second content object (CALCULSIMIL, 102, 304).

A set of similarity values may be one similarity value and a set of similarity methods may be one similarity method.

The raster image processing method of a preferred embodiment may comprise the following steps:

c) checking the set of similarity values against a set of threshold values or a set of threshold ranges by a controller (CHECKSIMIL, 103, 305);

d) converting the first and second content object by a first image manipulation method with one or more equal parameters of the first image manipulation method (IMSIMIL, 105, 202, 307, 402).

A preferred embodiment of the raster image processing method comprises a similarity method which is a pixel-base image similarity method or a histogram-based image similarity method or a texture similarity method or shape similarity method.

A preferred embodiment of the raster image processing method comprises a similarity method between at least a part of the image content of the first content object and at least a part of the image content of the second content object. Preferably this preferred embodiment comprises a continuity control method as similarity method (see FIG. 6 and FIG. 11).

Another preferred embodiment of the raster image processing method comprises merging or flattening of the images from the first content object and second content object.

The document in a preferred embodiment of the raster image processing method may be page description language-format or variable data language-format or document mark-up language.

a) obtaining two content objects of the plurality of content objects (OBTAIN, 101);

b) calculating the similarity between the two content objects as a similarity value (CALCULSIMIL, 102);

c) checking the similarity value against a threshold to evaluate the similarity between the two content objects (CHECKSIMIL, 103);

d) if there is a similarity between the two content objects (CONDITIONSIMIL, 104) than an image manipulation method (IMSIMIL, 105) is applied on the two content objects with one or more equal parameters.

Figure 1:
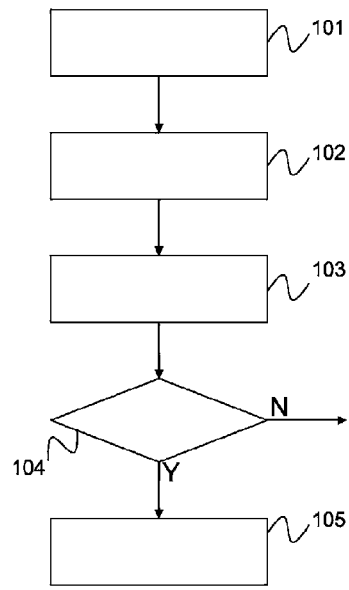
FIG. 1 is a flowchart of a preferred embodiment of the raster image processing method, wherein after the interpretation of the document in a plurality of content objects the following steps are comprised.

The similarity value in FIG. 1 may also be a set of similarity values and/or the threshold may also be a set of threshold values.

Figure 2:
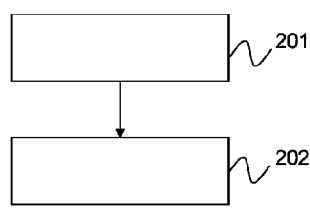

FIG. 2 is a flowchart of another preferred embodiment of the raster image processing method wherein after the interpretation of the document in a plurality of content objects the following steps are comprised:

a) grouping the content objects that are evaluated as similar between each other (GROUPSIMIL, 201);

b) applying on each content object of a group an image manipulation method with one or more equal parameters (IMSIMIL, 202).

Figure 3:
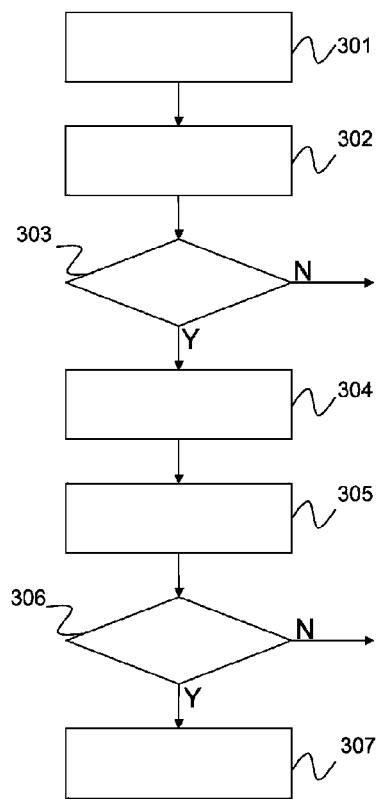

FIG. 3 is a flowchart of a preferred embodiment of the raster image processing method wherein after the interpretation of the document in a plurality of content object the following steps are comprised:

a) obtaining two content objects of the plurality of content objects (OBTAIN, 301);

b) calculating the minimal distance between the two content objects (CALCULDIST, 302);

c) if the minimal distance is smaller than 10 millimeters (CONDITIONDIST, 303) than calculating the similarity between the two content objects as a similarity value (CALCULSIMIL, 304);

d) checking the similarity value against a threshold to evaluate the similarity between the two content objects (CHECKSIMIL, 305);

e) if there is a similarity between the two content objects (CONDITIONSIMIL, 306) than an image manipulation method is applied on the two content objects with one or more equal parameters (IMSIMIL, 307).

The similarity value in FIG. 3 may also be a set of similarity values and/or the threshold may also be a set of threshold values.

Figure 4:
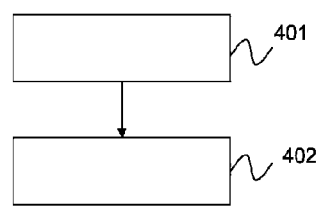

FIG. 4 is a flowchart of another preferred embodiment of the raster image processing method wherein after the interpretation of the document in a plurality of content objects the following steps are comprised:

a) grouping the content objects that are evaluated as similar between each other and have a minimal distance smaller between each other than 10 millimeters (GROUPSIMILDIST, 401);

b) applying on each content object of a group an image manipulation method with one or more equal parameters (IMSIMIL, 402).

Figure 5:
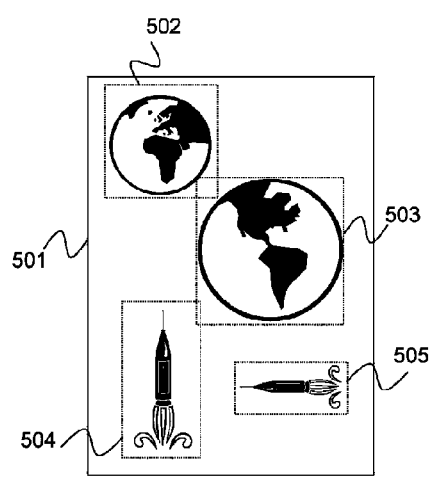

FIG. 5 is a document (501) with two content objects representing the earth from two viewing sides (502, 503) and two content objects representing a rocket (504, 505). The content objects representing the earth (502, 503) may be evaluated as similar by a preferred embodiment of the raster image processing due to the pattern of the earth and the content objects representing the rocket (504, 505) may be evaluated as similar by a preferred embodiment of the raster image processing due to the pattern of a rocket.

Figures 6, 7:
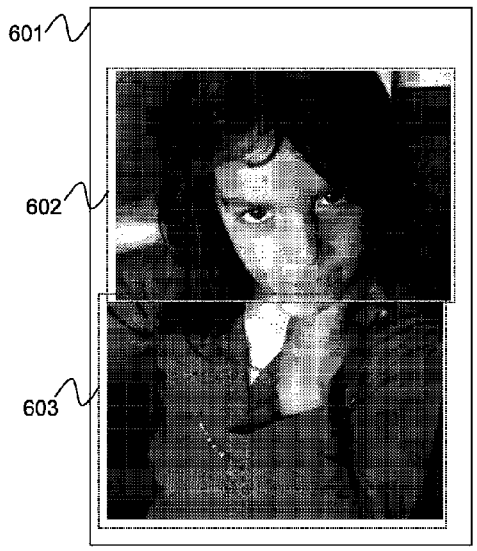

FIG. 6 is a document (601) with two content objects representing a part of an image of a girl (602, 603). The two content objects (602, 603) may be evaluated as similar by a preferred embodiment of the raster image processing due to the continuity between the two content objects (602, 603). A typical image manipulation method as content object position correcting may be used due the mis-alignment of the two content objects.

FIG. 7 shows the performance results comparing a CPU with two different GPUs on the conversion of a content object with a standard unsharp mask method (USM) as image manipulation method.

Figure 8:
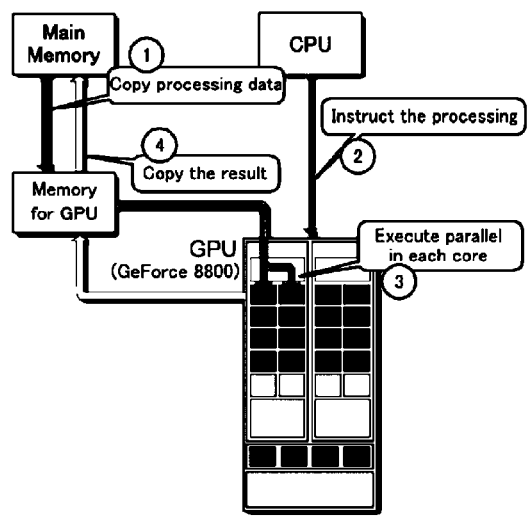

FIG. 8 illustrates a CUDA processing workflow.

Figure 9:
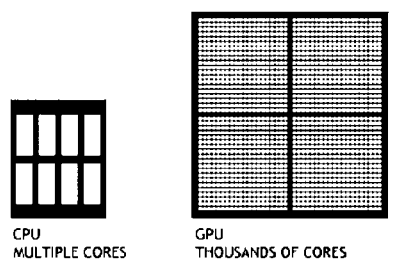

FIG. 9 is an illustration of a CPU with multiple cores and GPU with thousands of cores.

Figure 10:
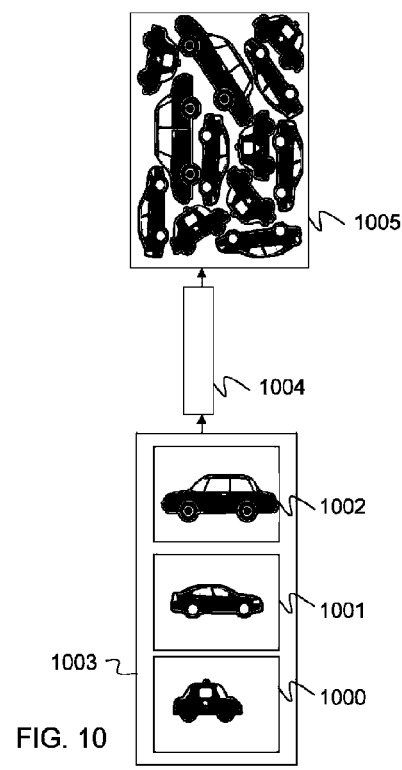

FIG. 10 shows a true shape nesting method comprised in a preferred embodiment of the raster image processing method (1004) on several raster graphics which represents several types of cars (1000, 1001, 1002). The raster graphics (1000, 1001, 1002) are queued in a nesting queue (1003) and the document (1005) is the result of the true shape nesting method to reduce the unused space in the document space of the generated document (1005).

Figure 11:
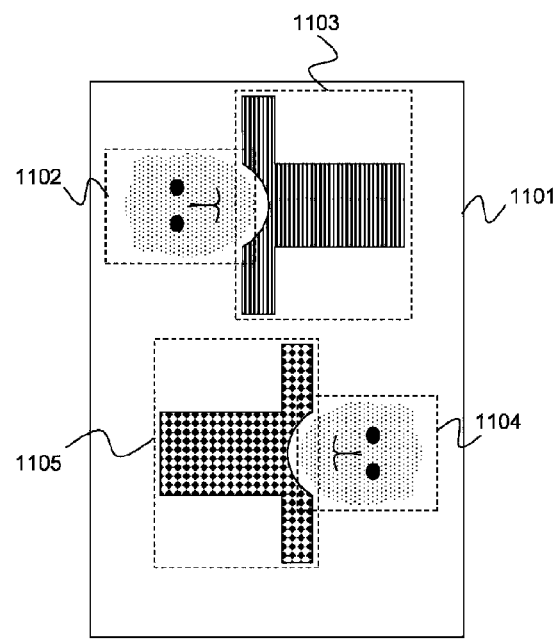

FIG. 11 is a document (1101) with two content objects representing a head of a bear (1102, 1104) and two content objects representing a T-shirt (1103, 1105). The content objects representing the head of a bear (1102, 1104) may be evaluated as similar by a preferred embodiment of the raster image processing due to the pattern of a head and the content objects representing the T-shirt (1103, 1105) may be evaluated as similar by a preferred embodiment of the raster image processing due to the pattern of a T-shirt. The a object (1102, 1103) may also be evaluated as similar by a preferred embodiment of the raster image processing due to the continuity between the 2 content objects (1102, 1103), e.g. due to the bottom of the head of the bear has the same shape as the collar of the T-shirt, and the content object (1104, 1105) may also be evaluated as similar by a preferred embodiment of the raster image processing due to the continuity between the two content objects (1104, 1105), e.g. due to the bottom of the head of the bear has the same shape as the collar of the T-shirt.

DETAILED DESCRIPTION OF THE PREFERRED EMBODIMENTS

Definitions

Document

A document (501, 601, 1005, 1101) comprises content, graphically arranged, in a document space. A document is digital stored in a storage unit such as hard disk drive (HDD) connected to a hardware configuration such as a computer, memory in a central processing unit (CPU) comprised in a hardware configuration and the like. The graphically arrangement, also called lay-outing, of the content in the document space is also called the lay-out of the document. A preferred embodiment of the raster image processing method comprises a document preferably with a static layout and more preferably with a dynamic layout. Static layout design may involve more graphic design and visual art skills; whereas dynamic layout design may involve more interactive design and content management skills to thoroughly anticipate content variation.

The document space of the document in a preferred embodiment of the raster image processor is a two dimensional space with two fixed dimensions, more preferably the document space is a page or multiple pages and most preferably a web-page. In another preferred embodiment of the raster image processor the document space may be a two dimensional space with one fixed and one endless dimension such as in the rendering method of multiple print jobs disclosed in EP 1933257 (Agfa Graphics NV).

The content of a document may be defined in one or more colors by one or more content objects (502, 503, 504, 505, 602, 603, 1102, 1103, 1104, 1105) such as photographic images, business graphs, text, labels and the like, which are also called objects of the document. A content object in a document represents an image. In a preferred embodiment of raster image processing method a content object is preferably a vector graphic or a raster graphic, more preferably a raster graphic and most preferably a photographic image. A raster graphic is also known as a bitmap, contone or a bitmapped graphic and represent a two-dimensional discrete image P(x,y). A vector graphic, also known as object-oriented graphic, uses geometrical primitives such as points, lines, curves, and shapes or polygon(s), which are all based on mathematical expressions, to represent an image.

In a preferred embodiment of the raster image processing method the document is preferably created by a nesting method on a plurality of content objects or a plurality of documents in a document space and more preferably created by a true shape nesting method on a plurality of content objects in a document space. The nesting method may be comprised in the raster image processing method and preferably the true shape nesting may be comprised in the raster image processing method. A nesting method is a method to position a plurality of raster graphics or vector graphics in a document space of a document to minimize the waste of substrate if printed on a printer device. A true-shape nesting method is a nesting method wherein the shape of the raster graphics or vector graphics is calculated and used to minimize the waste of substrate of substrate if printed on a printer device (see FIG. 10).

The content of the document in a preferred embodiment of raster image processing method is preferably defined in a vector graphics format, also called line-work format, such as Scale Vector Graphics (SVG) or AutoCad Drawing Exchange Format (DXF) and more preferably defined in a page description language (PDL) such as Printer Command Language (PCL): developed by Hewlett Packard, Postscript (PS): developed by Adobe Systems or Portable Document Format (PDF): developed by Adobe Systems. Preferably the lay-out of the document in this preferred embodiment is created in a desktop publishing (DTP) software package such as Adobe InDesign™, Adobe PageMaker™, QuarkXpress™ or Scribus (http://scribus.net/canvas/Scribus).

In another preferred embodiment of the raster image processing method the content of the document is preferably defined in a document markup language, also called mark-up language, such as IBM's Generalized Markup Language (GML) or Standard Generalized Markup Language (ISO 8879:1986 SGML), more preferably defined in HyperText Markup Language (HTML) and most preferably defined in HTML5, the fifth revision of the HTML standard (created in 1990 and standardized as HTML 4 as of 1997) and, as of December 2012, is a candidate recommendation of the World Wide Web Consortium (W3C). Such a document is sometimes called a web-document. Preferably the layout of the document in this preferred embodiment is created in a web-design software package by Cascading Style Sheets (CSS), a style sheet language used for describing the content of the document in the document markup language and more preferably the layout of the document in this preferred embodiment is created in a web-design software package by Cascading Style Sheets 3 (CSS3), published from the CSS Working Group of the World Wide Web Consortium (W3C).

In another preferred embodiment of the raster image processing method the content of the document is preferably defined in a Variable Data Printing format (VDP) such as Intelligent Printer Data Streams (IPDS): found in the AS400 and IBM mainframe environments and used with dot matrix printers, Variable data Intelligent PostScript Printware (VIPP): A proprietary VDP language from Xerox, traditionally used in the transactional black-and-white printing market, Variable Print Specification (VPS): a VDP language from Creo, Advanced Function Presentation (AFP) format defined by AFP Consortium (AFPC), more preferably defined in Personalized Print Markup Language (PPML), an XML-based industry standard printer language for variable data printing defined by Printing On Demand Initiative (PODi) and most preferably defined in PDF/VT published in 2010 as ISO 16612-2.

In several document formats to describe the content of a document such as vector graphic formats, page description format language, document markup language or variable data printing format has the capability to store meta-data in a content object of the document. Meta-data of a content object is defined as the data providing information about one or more aspects of the content object such as:

Means of creation of the content data of the content object; or

Purpose of the content data of the content object; or

Time and date of creation of the content data of the content object; or

Creator or author of the content data of the content object; or

Position of the content object in the document space of the document; or for raster graphics meta-data defined by photographic meta-data standards such as:

IPTC Information Interchange Model IIM (International Press Telecommunications Council); or IPTC Core Schema for XMP; or XMP—Extensible Metadata Platform (an ISO standard); or Dublin Core (Dublin Core Metadata Initiative—DCMI); or PLUS (Picture Licensing Universal System); or Exchangeable image file format (Exif) published by JEITA (Japan Electronics and Information Technology Industries Association).

Another standard that may be meta-data of a content object is color profile such as an ICC-profile. An ICC-profile is a set of data that characterizes a color input or content output device, or a color space, according to standards promulgated by the International Color Consortium (ICC). Profiles describe the color attributes of a particular device or viewing requirement by defining a mapping between the device source or target color space and a profile connection space (PCS). This PCS is either CIELAB ($L^*a^*b^*$) or CIEXYZ. Mappings may be specified using tables, to which interpolation is applied, or through a series of parameters for transformations. The particular device may be a contone output device or an image capturing device such as an image scanner, digital photo camera.

A content object of a preferred embodiment of the raster image processing method may comprise meta-data to provide information about the content object. A preferred embodiment of the raster image processing method may interpret the meta-data of the content object or may interpret the document to generate meta-data of the content object such as the position of the content object in the document space.

A preferred embodiment of the raster image processing method has a document that is defined in a document format selected from vector graphic formats, document markup language or variable data printing format, more preferably selected from page description formats, variable data printing format or document markup language and most preferably selected from Portable Document Format (PDF) or the fifth revision of HyperText Markup Language (HTML5).

Raster Image Processing Method

A raster image processing method is an image manipulation method that interpret a document to render the interpretation of the document to:

a raster graphic which is suitable for viewing on a display device such as a television, computer monitors or the display device of a tablet computer; or a raster graphic which is suitable for projecting the raster graphic by a projector device such as a video-projector, LCD projector, DLP projector LED projector or laser diode projector; or a raster graphic which is suitable for printing on a printing device such as a toner-based printer, an inkjet printer or offset press.

A content output device is a device which reproduces the content data of a document in its document space such as a display device, projector device or printer device. The raster image processing method of a preferred embodiment may comprise a reproducing method on a content output device. Preferably the reproducing method is a projecting method on a projector device, more preferably a displaying method on a display device and most preferably a printing method on a printer device.

A preferred embodiment of the raster image processing method may be comprised:
- in a displaying method of a display device; or
- in a projecting method of projector device; or
- in a printing method of a printer device; or
- in a displaying method of a document viewer, such a desktop publishing (DTP) software package, Portable Document Format (PDF) reader or web-browser and the like.

Preferably the raster image processing method of a preferred embodiment comprises a screening method to screen the raster graphic to a halftone before printing the document on a printing device.

A raster image method is a computer implemented method that is performed on a hardware (HW) configuration, such as a computer, tablet computer and the like, comprising a central processing unit (CPU), a memory, a storage device such as a hard disk drive (HDD), a communication interface (IF) device that sends and receives data to and from other hardware configurations via a network. The hardware configuration may comprise an user interface (UI) device that may comprise a display device.

The apparatus that performs a raster image processing method is called a raster image processor (RIP). A raster image processor (RIP) of a preferred embodiment of the raster image processor (RIP) may comprise a prepress workflow system such as Prinect Workflow System™ from Heidelberger Druckmaschinen AG or Apogee Prepress™ from Agfa Graphics NV or the prepress workflow system disclosed in US20130194598 (FUJI XEROX).

In a preferred embodiment of the raster image processing method comprises one or more image manipulation methods on content objects performed by one or more image manipulation systems (IMS).

Preferably the image manipulation methods on the content objects in the present preferred embodiment of the raster image processing method and all preferred embodiments of the raster image processing methods are selected from:
- color and/or colorant space converting (CMS);
- auto-contrasting;
- unsharp masking (USM);
- content object position correcting;
- noise reducing; despeckling;
- skin tone correcting; red-eye removing;
- applying a convolution;
- rotating; scaling; cropping;
- despeckle; destair
- casting A preferred embodiment of the raster image processor comprises a cloud-based web-to-print solution that enables print service providers (PSP) and/or marketing services providers to create and manage online stores for printed documents. Preferably an user may layout or edit documents in this cloud-based web-to-print solution with an online document editor.

Another preferred embodiment of the raster image processor comprises a web portal for document-upload and sending a print approval of a document. A web portal is a specially-designed web page at a website which brings information together from diverse sources in a uniform way.

A preferred embodiment of the raster image processing method comprises an extra step of soft-proofing. Preferably the soft-proofing comprises a streaming method to shortens file transfer and approval cycles by using streaming technology for large or many soft-proofs. Soft-proofing, also called monitor proofing, is a step in the prepress printing process to check the accuracy of text and images used for printed products on a display device before printing.

Another preferred embodiment of the raster image processor comprises a color management system to provide end-to-end color management for reliable, predictable color performance. Preferably the color management system is compatible with ICC profiles; and/or able to build custom color profiles to match and to certify a printing device to a proofing standard such as ISO 12647-2 or ISO 12647-7.

Other preferred embodiments of the raster image processing method may comprise a step or more steps selected from flattening, nesting, true-shape nesting (see FIG. 10), tiling, imposing pages (imposition) or trapping.

Tiling is a method that allows a user to convert a large image of a document in several smaller sized images by dividing the image in parts so it can be reproduced on a content output device which may be manipulated together in a finishing method on the reproductions of the content output to a reproduction of the large image.

If a document contains transparency and/or overprint between content objects it undergoes a method called flattening to convert the document to content objects without transparencies and/or overprints which doesn't influence the reproduction of the document. A flattening method is disclosed in U.S. Pat. No. 7,433,103 (EASTMAN KODAK COMPANY). A flattening method may also convert content objects in a document to content objects without transparencies and/or overprints which doesn't influence the reproduction of the converted content objects. A flattening method is preferably in a preferred embodiment of the raster image processing method at the end to keep flexibility of the content objects in the document because it may avoid color gamut issues in a reproduction of the document.

Image Manipulation Methods

An image manipulation method on an content object in the present preferred embodiment of the raster image processing and in any preferred embodiment of the raster image processing method needs to be interpreted broadly as:
- converting a raster graphic to a raster graphic; and
- converting a vector graphic to a vector graphic; and
- converting a vector graphic to a raster graphic (=rendering); and
- converting a raster graphic to a vector graphic (=vectorizing); and
- changing the meta data of the content object such as changing the position of the content object in the document space of the document.

The broadly interpretation of image manipulation method in the present preferred embodiment of the raster image processing and in any preferred embodiment of the raster image processing method is also called a content object processing method or object processing method.

A content object, as vector graphic or raster graphic, in a preferred embodiment of the raster image processing represents an image.

If an image manipulation method in the present preferred embodiment of the raster image processing and in any preferred embodiment of the raster image processing method only is applicable on raster graphics, a content object defined as vector graphic may be preferably converted to a raster graphics, prior performing the image manipulation method.

An image manipulation method may have parameters to characterize how the content object may be converted by the image manipulation method. An example of an image manipulation method on a content object is horizontal scaling the content object to a certain horizontal size wherein the horizontal size is one of the parameters of the horizontal scaling method. Another example of an image manipulation method on a content object is repositioning the content object in the document space of the document wherein the new X-coordinate and Y-coordinate may be parameters to this object repositioning method. An example of an image manipulation method on a content object defined as vector graphic to a vector graphic is the approximation of Bezier-defined curves to line-segmented curves e.g. for faster calculation when rendering this converted vector graphic. The maximum amount of line segments may be a parameter of this Bezier simplifying method and/or the minimum amount of line segments may be a parameter of this Bezier simplifying method.

An image manipulation method in the present preferred embodiment of the raster image processing and in any preferred embodiment of the raster image processing method may be defined as the following formula (I):

$$O_{converted} = f(O, p_1, p_2, p_3, p_4, \ldots, p_n)$$

wherein the function f as image manipulation method convert the content object O with n parameters $(p_1, p_2, \ldots, p_n)$ to a converted content object $O_{converted}$.

An image manipulation method in the present preferred embodiment of the raster image processing and in any preferred embodiment of the raster image processing method is performed by an image manipulation system (IMS).

An image manipulation method is a software implemented method that is performed by a central processing unit (CPU); comprised in hardware (HW) configuration such as a computer, tablet computer and the like. A preferred embodiment of the raster image processor comprises a graphic processor unit (GPU) to convert an image of a content object with an image manipulation method.

An overview of image manipulation methods that may be comprised in the present preferred embodiment of the raster image processing and in any preferred embodiment of the raster image processing method is disclosed in Part 3 "Discrete two-dimensional processing" [Page 145-244] and Part 4 "Image improvement" [Page 245-418] of PRATT, William K. Digital Image Processing: PIKS Scientific Inside. 4th edition. John Wiley.

An image manipulation method that may be comprised in the present preferred embodiment of the raster image processing and in any preferred embodiment of the raster image processing method may comprise discrete two-dimensional processing methods selected from:
  superposition and convolution methods;
  unitary image transform methods such as Fourier transform methods;
  linear image manipulation methods such as Fourier transform filtering methods.

An image manipulation method that may be comprised in the present preferred embodiment of the raster image processing and in any preferred embodiment of the raster image processing method may comprise image improvement methods selected from:
  image enhancement methods such as contrast manipulation, histogram modification or noise cleaning;
  image restoration methods;
  geometrical image modification methods such as rotation, scaling, spatial warping, perspective transformation, resampling.

An image manipulation method that may be comprised in the present preferred embodiment of the raster image processing and in any preferred embodiment of the raster image processing method is preferably selected from:
  discrete two-dimensional processing methods;
  image improvement methods.

Similarity Methods

The similarity method in a preferred embodiment of the raster image processing method is a method that compares one or more characteristics of obtained content objects to be equal and/or in the same range of threshold values. A similarity method is a method to find a similarity between the obtained content objects (see FIG. 5, FIG. 6 and FIG. 11).

Two content objects in a document are similar:
  as one or more characteristics, also called similarity values, are equal; and/or
  as one or more characteristics, also called similarity values, are in ranges of threshold values.

Higher the amount of similarity values that are equal and/or higher the amount of similarity values that are in ranges of threshold values, higher the amount of similarity between the two content objects.

In a preferred embodiment of the raster image processing the similarity between two obtained content objects comprises the calculation of a set of similarity values by a set of similarity methods between the first and second content object. In a preferred embodiment of the raster image processing method the set of similarity values is checked against a set of threshold values or a set of threshold ranges. The checking of calculated similarity values is also called evaluating the similarity. If the two objects are similar than in a preferred embodiment of the raster image processing method the two objects are converted by an image manipulation method with one or more equal parameters of the image manipulation method.

If the two objects are similar than in a preferred embodiment of the raster image processing method the two objects are converted by an image manipulation method with all equal parameters of the image manipulation method.

A similarity method in the present preferred embodiment of the raster image processing and in any preferred embodiment of the raster image processing method is performed by a similarity control device. A similarity method returns one or more similarity values and preferably it may return a set of similarity values.

A similarity method is a software implemented method that is performed by a central processing unit (CPU); comprised in hardware (HW) configuration such as a computer, tablet computer and the like. A preferred embodiment of the raster image processor comprises a graphic processor unit (GPU) to calculate a set of similarities between content objects by a similarity method.

A similarity method on a plurality of content objects may be a similarity method on image manipulated content objects. The image manipulated content objects are the plurality of content objects applied with one or more image manipulation methods such as a convolution or color conversion.

In a preferred embodiment of the raster image processing method more than two content objects may be evaluated on similarity. The raster image processing method may group content objects of a document which are similar to each other.

In a preferred embodiment of the raster image processing method each content object of the group is converted by an image manipulation method with one or more equal parameters of the image manipulation method.

In another preferred embodiment of the raster image processing method each content object of the group is converted by an image manipulation method with all equal parameters of the image manipulation method.

The grouping of content objects that are evaluated as similar by one or more similarity methods in a plurality of groups and image processing each content object of a group of the plurality of groups with one or more equal parameters of the image manipulation method is called a content object collecting method. The groups of content objects which are evaluated as similar may remain in further and/or other image processing of the content objects as preferred embodiment of the raster image processing method. A preferred embodiment of the raster image processing method comprises a content object collecting method.

The similarity method may in a preferred embodiment of the raster image processing method compare the meta-data of the two obtained content objects; more preferably compare the images of the two obtained content objects by an image comparing method and most preferably compare a part of the images of the two obtained content objects by an image comparing method.

A preferred similarity method in a preferred embodiment of the raster image processing method is a pixel-based image similarity method on raster graphics wherein at least a part of the pixels in the discrete image P(i,j) from the first content object is compared with at least a part of the pixels in the discrete image Q(i,j) from the second content object. A part of the pixels in the discrete image P(i,j) and Q(i,j) may be a region, which defines a group of neighbouring pixels in the discrete images. Preferably the pixel-based image similarity method on raster graphics compares a plurality of regions in the discrete images P(i,j) and Q(i,j) to find a similarity between the first and second content object.

Other examples of part of pixels in the discrete images P(i,j) or Q(i,j) in a preferred embodiment may be:

the background of the image; or
a segment in the image calculated with a image segmentation method; or
pixels in a contour calculated with an edge detection method; or
pixels that belong to a range of colors in the colorant space such as RGB or CMYK; or
pixels that belong to a range of colors in the color space such as CIELab or CIEXYZ; or
pixels at the boundaries of the image; or
regions in both discrete images P(i,j) or Q(i,j) that nearly touch or overlap each other.

A pixel-based image similarity method on raster graphics may be defined by the following formula (II):

$$PB(P, Q) = \sum_{i=1}^{w} \sum_{j=1}^{h} |c(P, i, j) - c(Q, i, j)|$$

wherein:
P is the discrete image of the first content object with image size w×h; and
Q is the discrete image of the second content object with image size w×h; and
the function c( ) is an image characteristic that assigns a number to each image pixel of a discrete image; and
if PB(P,Q), a similarity value, is smaller than a threshold value, the first and second content object is similar.

An example of function c( ) is obtaining a gray value of the pixel.

A pixel-based image similarity method on raster graphics may be defined by the following formula (III):

$$PB(P, Q) = \sum_{i=1}^{w} \sum_{j=1}^{h} (c(P, i, j) - c(Q, i, j))^2$$

wherein:
P is the discrete image of the first content object with image size w×h; and
Q is the discrete image of the second content object with image size w×h; and
the function c( ) is an image characteristic that assigns a number to each image pixel of a discrete image; and
if PB(P,Q), a similarity value, is smaller than a threshold value, the first and second content object is similar.

An example of function c( ) is obtaining a gray value of the pixel.

A pixel-based image similarity method on raster graphics may be defined by the following formula (IV):

$$PB(P,Q) = \Sigma_{i=1}^{w} \Sigma_{j=1}^{h} (c(IMS(P),i,j) - c(IMS(Q),i,j))^2$$

wherein:
P is the discrete image of the first content object with image size w×h; and
Q is the discrete image of the second content object with image size w×h; and
the function IMS( ) is a image manipulation method on a discrete image; and
the function c( ) is a image characteristic that assigns a number to each image pixel of a discrete image; and
if PB(P,Q), a similarity value, is smaller than a threshold value, the first and second content object is similar.

An example of function c( ) is obtaining a gray value of the pixel.

A pixel-based image similarity method on raster graphics may be using statistical methods such as variance and probability distribution.

Another preferred similarity method in a preferred embodiment of the raster image processing method is a histogram-based image similarity method on raster graphics wherein at least a part of the image histogram of at least a part of the pixels in the discrete image P(i,j) from the first content object is compared with at least a part of the image histogram of at least a part of the pixels in the discrete image Q(i,j) from the second content object. A part of the pixels in the discrete image P(i,j) and Q(i,j) may be a region, which defines a group of neighbouring pixels in the discrete images.

Preferably the histogram-based image similarity method on raster graphics compares a plurality of regions in the discrete images P(i,j) and Q(i,j) to find a similarity between the first and second content object.

An image histogram is a type of histogram that acts as a representation of the tonal distribution in a discrete image.

An image histogram may be a multi-dimensional histogram as representation of the distribution of colors in a discrete image, also called a color image histogram. An image histogram may be represented as an image histogram vector or as a look-up-table (LUT).

Another image histogram that may be comprised in the histogram-based image similarity method is a luminosity histogram calculation wherein the luminosity histogram represents the distribution of the luminosity in a discrete image.

A histogram-based image similarity method on raster graphics may be using statistical methods such as variance and probability distribution.

A histogram-based image similarity method on raster graphics may be defined by the following formula (V):

$$HB(P, Q) = \sum_{i=1}^{k} \frac{(h_i(IMS(P)) - h_i(IMS(Q)))^2}{\max(h_i(IMS(P)), h_i(IMS(Q)))}$$

wherein:

P is the discrete image of the first content object; and

Q is the discrete image of the second content object; and the function $h_i(\ )$ is the value of the $i^{th}$ element of the image histogram vector; and the function IMS( ) is a image manipulation method on a discrete image; and if HB(P,Q), a similarity value, is smaller than a threshold value, the first and second content object is similar.

A preferred similarity method in a preferred embodiment of the raster image processing method is a texture similarity method wherein one or more positions and/or amount of a visual pattern in the images of the two content objects are compared. The identification of a specific pattern may be achieved by modelling a pattern as a two-dimensional gray raster graphic and be searched in the discrete images P(i,j) of the first content object and Q(i,j) of the second content object. The search may be done by comparing the modelling of the pattern in a degree of contrast, regularity, coarseness and/or directionality in at least one region of the discrete images P(i,j) and Q(i,j). The texture similarity method may evaluate the similarity of the two content objects in a preferred embodiment with more than one visual pattern in the images.

Another preferred similarity method in a preferred embodiment of the raster image processing method is a shape similarity method wherein shapes in the images of the two content objects are compared. The identification of shapes may be achieved by applying image segmentation methods and/or edge detection methods in the discrete images P(i,j) of the first content object and Q(i,j) of the second content object and the found shapes in at least one region of the discrete images P(i,j) and Q(i,j) are compared. Preferably the found shapes are compared in size, shape and/or orientation.

The similarity method may in a preferred embodiment of the raster image processing method also compare one or more results of one or more image measuring methods applied on the images of the two obtained content objects and more preferably compare one or more results of one or more image measuring methods applied on a part of the images of the two obtained content objects and most preferably compare one or more results of one or more image measuring methods applied on a region of the images of the two obtained content objects.

An image measuring method may be selected from:

histogram calculation which results in an image histogram vector;

noise calculation which results in the noise factor;

color indexing method which results in a sorted list of most used colors;

Preferably a similarity method in a preferred embodiment of the raster image processing may comprise an image analysis method. An overview of image analysis methods that may be comprised in the similarity methods of the present preferred embodiment of the raster image processing and of any preferred embodiment of the raster image processing method is disclosed in Part 5 "Image Analysis" [Page 419-678] of PRATT, William K. Digital Image Processing: PIKS Scientific Inside. 4th edition. John Wiley.

Preferably an image analysis method, comprised in an image comparing method as one of the similarity methods in a preferred embodiment of the raster image processing method comprises:

edge detection; and/or image segmentation; and/or shape analysis; and/or texture analysis.

A preferred embodiment of the raster image processing comprises a similarity method selected from:

pixel-based image similarity method;

histogram-based image similarity method;

texture similarity method;

shape similarity method.

A similarity method in a preferred embodiment of the raster image processing may combine other similarity methods.

Another preferred embodiment of the raster image processing method comprises a step of merging the content objects if they are evaluated as similar prior the step of the image manipulation method. A more preferred embodiment comprises the step of image manipulation on each content object by prior merging the images of the content objects and after the step of image manipulation on one of the content objects demerging or removing the images of the other content objects.

Another preferred embodiment of the raster image processing method comprises a step of flattening the content objects if they are evaluated as similar prior the step of the image manipulation method.

A preferred embodiment of the raster image processing method, which may comprise a continuity controlling method as similarity method, obtains two content objects that are positioned nearby each other in the document space of the document; preferably the minimal distance in the document space between the first and second content object is smaller than 10 millimeters; more preferably the first and second content object are touching each other in the document space or at least partially overlapping in the document space. It is found that content objects that are positioned close together in the document space have a higher probability to be similar.

In a preferred embodiment of the raster image processing method, which may comprise a continuity controlling method as similarity method only regions in the image of both content objects that are close together are evaluated on similarity between the content objects, preferably the minimal distance in the document space of a region of the first content object and a region of the second content object is smaller than 10 millimeters whereon the similarity is evaluated, more preferably the two regions are touching each other in the document space or at least partially overlapping in the document space whereon the similarity is evaluated.

The minimal distance in the document space between two content objects may be determined by calculating the minimal distance in the document space between the borders of content data of the two content objects. The raster image processing method may interpret the document to calculate the borders of content data of a content object in the document space based on the shape of the content data or may calculate with an edge detection algorithm the borders of content data of a content object in the document space.

Another preferred embodiment of the raster image processing method is that the image manipulation method on the two content objects converts the two content objects so a higher similarity between the content objects is achieved, preferably wherein the image manipulation method is a content object position correction in the document space and more preferably wherein the image manipulation method is a content object position correction in the document space and wherein a similarity method is a continuity control method.

Continuity Control Method

A similarity method in a preferred embodiment of the raster image processing method may be a continuity controlling method wherein content objects are evaluated how visual continues the merged images of the content objects from a region of a content object in the transition to a another region of another content object.

If the continuity controlling method is performed on two content objects, in a preferred embodiment of the raster image processing method, the two content objects are evaluated how visual continues the merged images of both content objects from a first region of the first content object in the transition to a second region to the second content object.

A similarity method in a preferred embodiment of the raster image processing method may also be a continuity controlling method wherein content objects are evaluated, after flattening, how visual continues the merged images of the flattened content objects from a region of a content object in the transition to a another region of another content object.

The checking of calculated similarity values from the continuity controlling method is also called evaluating the continuity. FIG. 6 and FIG. 11 are examples wherein two content objects are evaluated as continue, also called visual continuous.

A preferred embodiment of the raster image processing method comprises a continuity controlling method as similarity method.

In a preferred embodiment of the raster image processing, the continuity controlling method comprises image comparing method, more preferably a pixel-based image similarity method.

The continuity controlling method may calculating the color differences at the boundaries of regions in the content objects, and checking the colour differences of consecutive pixels at the boundaries to be smaller than a threshold value, the content objects are evaluated as continue, also called visual continuous.

Or the continuity controlling method may comparing different sized blocks of neighbouring pixels at the boundaries of regions in the content objects, if a certain amount of matching blocks are found, based on the mean value of the colors in the blocks, the content objects are evaluated as continue, also called visual continuous.

In a preferred embodiment of the raster image processing, the continuity controlling method comprises a histogram-based image similarity method.

The continuity controlling method may calculate the image histogram at the boundaries of the content objects and compare the image histograms. If the boundaries have similar tonal distributions, the content objects are evaluated as continue, also called visual continuous.

The continuity controlling method may calculate the luminosity histogram at the boundaries of the content objects and compare the luminosity histograms. If the boundaries have similar luminosity distributions, the content objects are evaluated as continue, also called visual continuous.

In a preferred embodiment of the raster image processing, the continuity controlling method comprises a shape similarity method.

The continuity controlling method may apply an edge detection method on the merged images of the content objects and check the continuity of the edges at the transition from a region of a content object to another region of another content object. If the edges are continue, the content objects are evaluated as continue, also called visual continuous.

The continuity controlling method may apply an image segmentation method on the merged images of the content objects and check the continuity of the contours at the transition from a region of a content object to another region of another content object. If the contours are continue, the content objects are evaluated as continue, also called visual continuous.

In a preferred embodiment of the raster image processing, the continuity controlling method comprises a texture similarity method.

Content Output Devices

More and more content output devices, such as display devices and printer devices, are developed for the reproduction of images and/or text. Examples of content output devices that are used to reproduce a document are CRT's, LCD's, plasma display panels (PDP), electroluminescent displays (ELD), carbon nanotubes, quantum dot displays, laser TV's, Electronic paper, E ink, projection displays, conventional photography, electrophotography, dot matrix printers, thermal transfer printers, dye sublimation printers and inkjet systems to name a few. Also the conventional printing systems such as offset printing, rotogravure, flexography, letterpress printing, and screen-printing are developed for the reproduction of images and/or text and are thus also content output devices.

Offset printing, which is an example of a conventional printing system, is a printing technique in which ink is spread on a metal plate with etched images, then transferred (offset) to an intermediary rubber blanket and finally to the printing surface by pressing the paper to the blanket. When printing color images, four plates are normally used, one for each CMYK component. Additionally, spot colors can be added by adding a new layer with the specific pigment needed.

Nowadays modern offset systems use computer to plate technology, which create plates directly from the computer output, contrary to the older technology where photographic films were created by computers and then used for creating the plate. Offset presses are big, expensive and complex devices which require experienced operators to run them. The process of preparing a document to be printed in an offset press is complicated, since plates have to be created and the operators have to spend some time manually preparing and calibrating the offset press to get the desired result. Even though this process is rather expensive and slow, the actual printing process is cheap, fast and produces high image quality.

This makes it a good solution for producing large amounts of copies. For this reason, it has become the most popular way of commercial printing and it is largely used for printing newspapers, magazines, books, etc.

In an inkjet system, which is an example of a digital printing system, the ink is directly deposited onto the paper, simplifying the printing mechanism and eliminating all the process of creating plates. Besides, it avoids the extra job that offset operators need to do in order to get the offset press ready for printing. Both things lead to a shorter turnaround time, cheaper starting point for a single copy and copies customization (which is not possible in offset since it is unviable to create a different plate for each copy).

Another advantage is the possibility of print a wider gamut (closer to the RGB gamut) than with offset. Also it is easier to print in almost every surface: wood, ceramic, plastic, etc. The quality of offset presses has always been considered higher in terms of resolution and crispness than for digital presses such as inkjet systems, although nowadays there are digital presses such as inkjet systems matching up the quality of offset presses. Nevertheless, digital printing has some disadvantages with respect to offset which can make difficult the decision of choosing one or another printing method. The resolution of a digital press depends on the dots per inch (dpi) parameter. Even though this parameter has been gradually increasing over the years, the quality of a digital press cannot be compared yet to the quality of an offset press in terms of resolution and crispness. Another shortcoming of digital presses is the handling of spot colors. Typically a digital press uses CMYK pigments to represent all the colors. As mentioned, only a subset of spot colors can be properly represented using CMYK. Some complex digital presses use an additional fifth or sixth colorant which helps to the reproduction of a larger subset of spot colors but still not enough to reproduce all of them in a good way.

A preferred embodiment is a printing method comprising preferred embodiment of the raster image processing method comprising the following steps:
  rendering the document to a continuous-tone bitmap;
  screening the continuous-tone bitmap to a half-tone;
  transferring the halftone to a printing device.

A preferred embodiment of the raster image processing comprises a step of screening the content objects differently depending their similarity.

Graphic Processing Units

Graphic Processing Units (GPU's) have been used to render computer graphics for years. Nowadays they are also used for general-purpose tasks due to their highly parallel structure, making them more efficient than Central Processing Units (CPU's). A GPU is an example of a parallel computing device, also called a parallel processing device.

GPUs can be combined with CPUs to achieve greater performance. In this way, serial parts of the code would run on the CPU and parallel parts would do it on the GPU. While CPUs with multiple cores are available for every new computer and allow the use of parallel computing, these are focused on having a few high performance cores. On the other hand, GPUs have an architecture consisting of thousands of lower performance cores (FIG. 9), making them especially useful when large amount of data have to be processed.

One of the most popular tools available on the market of GPU computing is CUDA. CUDA is a parallel computing platform and programming model created by Nvidia™ and available only for their GPUs. The main advantage of CUDA is its ease of use, using the language known as CUDA C which is essentially an extension of C, with similar syntax and very easy to integrate in a C/C++ environment.

FIG. 8 illustrates the CUDA processing flow. The needed data is first copied from the main memory to the GPU memory ((1)), the CPU sends an instruction to the GPU ((2)), the GPU executes the instruction in all the parallel cores at the same time ((3)), and the result is copied back from the GPU memory to the main memory ((4)).

CUDA parallel execution units consist of threads grouped into blocks. Combining the use of blocks and threads the maximum number of available parallel units can be launched, which for the latest GPUs can be more than 50 million. Even though this is a great amount of parallel capability, there are some cases where data might exceed the limit. In those cases, the only possibility is to iterate through the grid of millions of parallel units as many times as needed till all the data is processed.

A preferred embodiment of the raster image processor comprises one or more parallel computing devices, such as GPU's, for the calculation of a similarity method and/or the calculation of an image manipulation method.

FIG. 7 shows the performance results in table comparing a CPU with two different GPUs. The CPU is an Intel Xeon w3550 which has 4 cores at 3.06 GHz. The GPU 1 is a laptop GPU from 2011 and the GPU 2 is a desktop GPU from 2012 with almost ten times more processing power than the GPU 1. These are results for two sizes of images, 512×512 and 1024×1024, and using a standard unsharp mask method of different radius. The GPU 1 is already faster than the CPU, around three times faster, with almost the same performance for the small and the big image. The GPU 2 gives a performance up to seventeen times for the big image when the mask is larger. After running more tests with bigger images and larger masks, the performance keeps increasing till around twenty times and twenty two times. Smaller images give lower performance boost. This is logical because less parallelization is needed, so the slower GPU cores cannot counteract the speed of the CPU. It is interesting to check for which size of image the CPU is faster than the GPU. For the GPU 2, the CPU is only faster for images of 40×40. It is evident the great advantage of using a GPU for these kind of algorithms such as image manipulation methods or similarity methods where a lot of pixels can be processed at the same time.

INDUSTRIAL APPLICABILITY

A raster image processing method is an image manipulation method that interprets a document to render the interpretation of the document to a raster graphic which is used in the graphic industries as visual communication by displaying or printing the content of the document.

REFERENCE SIGNS LIST

TABLE 1

| | |
|---|---|
| 101, 301 | OBTAIN |
| 102, 304 | CALCULSIMIL |
| 103, 305 | CHECKSIMIL |
| 104, 306 | CONDITIONSIMIL |
| 105, 202, 307, 402 | IMSIMIL |
| 201 | GROUPSIMIL |
| 302 | CALCULDIST |
| 303 | CONDITIONDIST |

TABLE 1-continued

| | |
|---|---|
| 401 | GROUPSIMILDIST |
| 501, 601, 1005, 1101 | A document |
| 502, 503, 504, 505, 602, 603, 1102, 1103, 1104, 1105 | A content object |
| 1000, 1001, 1002 | A raster graphic |
| 1004 | A Raster Image Processor (RIP) |
| 1003 | A nesting queue |

The invention claimed is:

1. A raster image processing method including a plurality of parameters having values to manipulate a set of content objects, each content object corresponding to an image, each image including regions therein, and each region including boundaries, the method comprising the steps of:
determining distances between the boundaries of the regions corresponding to the images of the content objects;
when a distance between two of the boundaries is smaller than 10 mm or if the regions touch or partially overlap each other, selecting the content objects corresponding to the images to which the regions belong;
calculating a set of similarity values by applying a set of similarity methods to the selected content objects;
comparing the set of similarity values with a set of threshold values to determine if the content objects are similar or not; and
when it is determined that the content objects are similar, then performing raster image processing on each of the selected content objects of the set of content objects that share a value of at least one parameter to manipulate the selected content objects.

2. The raster image processing method according to claim 1, wherein the step of manipulating is selected from:
a discrete two-dimensional processing method;
an image improvement method; or
a content object positioning.

3. The raster image processing method according to claim 1, wherein the step of calculating the set of similarity values includes:
a pixel based similarity method;
a histogram based similarity method;
a shape based similarity method; or
a texture based similarity method.

4. The raster image processing method according to claim 2, wherein the step of calculating the similarity values includes:
a pixel based similarity method;
a histogram based similarity method;
a shape based similarity method; or
a texture based similarity method.

5. The raster image processing method according to claim 1, further comprising the steps of:
rendering a document to a continuous tone bitmap;
screening the continuous tone bitmap into a halftone bitmap; and
transferring the halftone bitmap to a printing device.

6. The raster image processing method according to claim 2, further comprising the steps of:
rendering a document to a continuous tone bitmap;
screening the continuous tone bitmap into a halftone bitmap; and
transferring the halftone bitmap to a printing device.

7. The raster image processing method according to claim 3, further comprising the steps of:
rendering a document to a continuous tone bitmap;
screening the continuous tone bitmap into a halftone bitmap; and
transferring the halftone bitmap to a printing device.

8. The raster image processing method according to claim 4, further comprising the steps of:
rendering a document to a continuous tone bitmap;
screening the continuous tone bitmap into a halftone bitmap; and
transferring the halftone bitmap to a printing device.

9. A raster image processor for manipulating a set of content objects according to a set of parameters having values, each content object corresponding to an image, each image including regions therein, and each region including boundaries, the system comprising:
measurement means for determining distances between the boundaries of the regions within the images corresponding to the set of content objects;
selection means for, when a distance between two of the boundaries is smaller than 10 mm or if the regions touch or partially overlap each other, selecting the content objects corresponding to the images to which the regions belong;
calculating means for calculating a set of similarity values by applying a set of similarity methods to the selected regions;
comparing means for comparing the set of similarity values with a set of threshold values to determine if the regions are similar or not;
determining means to determine if the regions are similar; and
image manipulation means for, when it was determined by the determining means that both regions are similar, performing on each one of the selected objects of the set of content objects an image manipulation method that shares a value of at least one parameter.

10. The raster image processing system according to claim 9, further comprising:
processing means for performing a discrete two-dimensional processing method;
image processing means for performing an image improvement method; and
image positioning means for performing a content object positioning.

11. The raster image processor according to claim 9, wherein the calculating means for calculating a set of similarity values by applying a set of similarity methods on the selected regions includes a parallel computing device.

* * * * *